United States Patent
Maligne et al.

(10) Patent No.: US 6,918,249 B2
(45) Date of Patent: Jul. 19, 2005

(54) PNEUMATIC BRAKE BOOSTER FOR USE IN A BRAKE SYSTEM

(75) Inventors: Jean-Charles Maligne, Aubervilliers (FR); Michael Hellebrandt, Le Chesnay (FR); Ulysse Verbo, Aulnay sous Bois (FR); Philippe Richard, Chelles (FR); Silverio Batista, Noisy le Sec (FR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/672,518

(22) Filed: Sep. 26, 2003

(65) Prior Publication Data

US 2004/0060291 A1 Apr. 1, 2004

(51) Int. Cl.[7] .............................................. B60T 13/00
(52) U.S. Cl. ....................................... 60/593; 91/376 R
(58) Field of Search ........................... 60/593; 91/376 R

(56) References Cited

U.S. PATENT DOCUMENTS 4,955,157 A * 9/1990 Brighton et al. ............... 42/77
5,487,327 A * 1/1996 Schluter et al. ............... 92/128
6,314,865 B1 * 11/2001 Henein et al. ............. 92/169.3

* cited by examiner

Primary Examiner—Thomas E. Lazo
(74) Attorney, Agent, or Firm—Leo H. McCormick, Jr.; Warren Comstock

(57) ABSTRACT

A brake booster comprising an envelope (2) having a longitudinal axis (X) formed of a first (4) and of a second (6) shell to define an interior volume divided by moving a skirt into a low-pressure first chamber and a variable-pressure second chamber. A three-way valve (12) actuated by a control rod places the front chamber and the rear chamber in communication at rest and during a braking phase interrupts the communication between the front chamber and the rear chamber and thereafter allows communication of pneumatic fluid at high pressure to the rear chamber. The booster is attached to the master cylinder by a clip-fastening arrangement wherein tabs (52) that radially extend from a sleeve tube (48) are plastically deformable in the radial direction on enter into a passage (54) in a flange (56) of the master cylinder and returning to the initial position when the attachment operation is complete.

20 Claims, 6 Drawing Sheets

PNEUMATIC BRAKE BOOSTER FOR USE IN A BRAKE SYSTEM

The present invention relates mainly to a pneumatic brake booster and to a system comprising a master cylinder attached to such a booster.

BACKGROUND OF THE INVENTION

A first known type of pneumatic brake booster comprises an envelope equipped with a first and second shell crimped together in a sealed manner via their radially external ends. The shells are made of pressed steel sheet.

In addition, the booster is associated with a master cylinder mounted fixedly with respect to the booster by means of a flange formed integrally with the body of the master cylinder.

In a known way, the flange of the master cylinder is trapped between an external face of the booster envelope and a nut screwed onto a projecting threaded end of the booster envelope.

However, as it is desirable to secure the master cylinder to the booster prior to mounting in the engine compartment, it is necessary for this additional step to be simple and quick.

In addition, in order to give the envelope, which is subjected to high stresses because of the high variations in pressure, sufficient rigidity, the thickness of the sheet is relatively thick and increases the weight of the booster. Now, motor manufacturers are seeking to reduce the weight of each of the components of a motor vehicle in order for example to reduce its fuel consumption.

To remedy this problem, a second type of booster equipped with reinforcements connecting the first shell to the second along the axis of the booster so as to make it possible to reduce the thickness of the sheet used to make the shells while at the same time maintaining the rigidity of the envelope of the conventional booster is known.

However, the current tierods are complicated to fit and therefore increase the booster assembly time and therefore the cost thereof. Furthermore, the weight saving obtained can still be improved upon. The tierods also make it possible to attach the booster to the wall, known as the bulkhead, separating the engine compartment from the passenger compartment. A threaded longitudinal first end of the tierod passes through the bulkhead through an orifice made therein and is secured to this bulkhead by a nut mounted from the passenger compartment. The tierod also allows the master cylinder to be secured to the booster using a nut screwed onto the tierod.

In addition, when work is being done on the braking circuit, it may be necessary to replace the master cylinder. Now, the current mode of attachment means that the booster has also to be detached from the bulkhead.

U.S. Pat. No. 5,410,880 envisages a booster with tierod equipped with a first sleeve tube secured to the shell of the booster on the side on which the master cylinder is mounted, the sleeve tube being equipped on its external periphery with a screw thread collaborating with a nut trapping the flange of the master cylinder against said shell of the booster. The tierod is mounted in the sleeve tube and so to detach the master cylinder from the booster all that is required is for the nut to be unscrewed and there is no need to remove the tierod and therefore detach the booster from the bulkhead.

However, such a solution is expensive because of the need to secure a first sleeve tube in a sealed manner to a shell of the booster. In addition, the sleeve tube and the nut are both made of steel so as to be able to withstand the tensile stresses applied by the flange of the master cylinder. In consequence, the weight saving remains modest. In addition, the master cylinder is attached to the booster prior to mounting in the engine compartment by a screw-nut system which takes a long time to perform.

SUMMARY OF THE INVENTION

It is therefore an object of the present invention to offer means for securing a booster to a master cylinder in a simple and quick way.

It is also an object of the present invention to offer a booster of lower weight.

It is also an object of the present invention to offer a booster equipped with tierods of simple design which are easier to mount.

It is also an object of the present invention to offer means for securing a booster to a master cylinder allowing the master cylinder to be detached from the booster without having to detach the booster from the bulkhead of a motor vehicle.

These objects are achieved by a booster equipped with a first and a second shell, said first shell being equipped with clip-fastening means securing a flange of a master cylinder to the booster.

In the case of a booster equipped with means for stiffening the envelope of the booster which are connected along the axis of the booster comprising at least two tierods, said clip-fastening means are borne by the means for stiffening the envelope of the booster.

In other words, one end of the means for stiffening the envelope comprises at least one element that is radially elastic, that moves aside as it passes into an orifice in the flange and returns to its initial position to form an at least temporary limit stop for the flange.

The advantage of the present invention is that it provides a lower number of parts, and therefore gives a lower cost price.

Another advantage of the present invention is that there is no need for special tools for securing the master cylinder to the booster.

The main subject of the present invention is a pneumatic brake booster comprising an envelope of longitudinal axis formed of a first and of a second shell, and defining an interior volume divided by a moving skirt into a low-pressure first chamber and a variable-pressure second chamber, a three-way valve actuated by a control rod and placing the front chamber and the rear chamber in communication at rest and during a braking phase interrupting the communication between the front chamber and the rear chamber and supplying the rear chamber with pneumatic fluid at high pressure, said booster also comprising at least one means for securing a master cylinder to said booster, advantageously two means for securing a master cylinder to said booster, characterized in that said means allow the master cylinder to be attached to the booster by clip-fastening.

Another subject of the present invention is a booster characterized in that said means comprise tabs secured to a second sleeve tube secured to the booster and running radially outward from said second sleeve tube.

Another subject of the present invention is a booster characterized in that said tabs are plastically deformable in the radial direction so as to enter a passage made in a flange of the master cylinder during the operation of attaching the master cylinder to the booster and so as to return to their initial position when the attachment operation is complete.

Another subject of the present invention is a booster characterized in that said tabs are regularly angularly distributed, advantageously being two in number, diametrically opposed.

Another subject of the present invention is a booster characterized in that it comprises at least one second sleeve tube secured to the first shell of the envelope of the booster.

Another subject of the present invention is a booster characterized in that the second sleeve tube is mounted securely on a spacer element arranged between the first and second shells of the booster and of longitudinal axis parallel to the axis of the booster.

Another subject of the present invention is a booster characterized in that the spacer element in which the second sleeve tube is mounted via an orifice made in the first shell is of tubular shape.

Another subject of the present invention is a booster characterized in that the spacer element comprises annular elements at a first and at a second longitudinal end bearing against the interior faces of the first and second shells.

Another subject of the present invention is a booster characterized in that said annular elements are loose flanges attached to the first and second ends of the spacer element.

Another subject of the present invention is a booster characterized in that the booster comprises a means for angularly indexing the booster with respect to a bulkhead of a motor vehicle secured to the second shell of the booster.

Another subject of the present invention is a booster characterized in that the angular indexing means are formed of a longitudinal end of a first sleeve tube projecting from the second shell toward the outside of the envelope of the booster.

Another subject of the present invention is a booster characterized in that the first sleeve tube is secured to the spacer element.

Another subject of the present invention is a booster characterized in that the first and second sleeve tubes are force-fitted into the spacer element.

Another subject of the present invention is a booster characterized in that the first and second sleeve tubes have longitudinal flutes projecting from their exterior periphery and forcibly collaborating with the interior surface of the tubular spacer element.

Another subject of the present invention is a booster characterized in that the first and second sleeve tubes are made of thermoplastic.

Another subject of the present invention is a booster characterized in that the first and second sleeve tubes comprise means leaktightly isolating the inside of the booster from the external environment.

Another subject of the present invention is a booster characterized in that the sealing means are made of elastomeric thermoplastic.

Another subject of the present invention is a braking system comprising a master cylinder equipped with a flange pierced with diametrically opposed passages and with a pneumatic brake booster, characterized in that said booster is a booster according to the present invention and in that the passages made in the flange and collaborating with the means for attachment by clip-fastening allow the master cylinder to be clip-fastened onto the booster.

Another subject of the present invention is a braking system characterized in that it is secured to a bulkhead of a motor vehicle using tierods mounted in the first and second sleeve tubes and the spacer element so as to emerge on each side of the booster along the longitudinal axis.

Another subject of the present invention is a system characterized in that the tierod comprises, at first and second longitudinal ends, a first and a second screw thread collaborating with a first and a second nut, said first nut allowing the booster to be fixed to the bulkhead and the second nut stiffening the envelope of the booster and reinforcing the attachment of the master cylinder to the booster.

Another subject of the present invention is a system characterized in that the second nut comprises means for breaking off the tabs of the clip-fastening attachment means as the second nut is screwed onto the tierod.

Another subject of the present invention is a system characterized in that the breaking means comprise at least one ramp made on one face of the nut in contact with the flange of the master cylinder and orientated in such a way that the depth of said ramp decreases as the second nut is tightened.

The present invention will be better understood with the aid of the description which will follow and of the attached figures in which the front and the rear corresponds respectively to the left and to the right of the drawings.

BRIEF DESCRIPTION OF THE DRAWINGS

FIG. 5 is a view of a detail of FIG. 3; and.

DETAILED DESCRIPTION OF THE INVENTION

Figure 1:
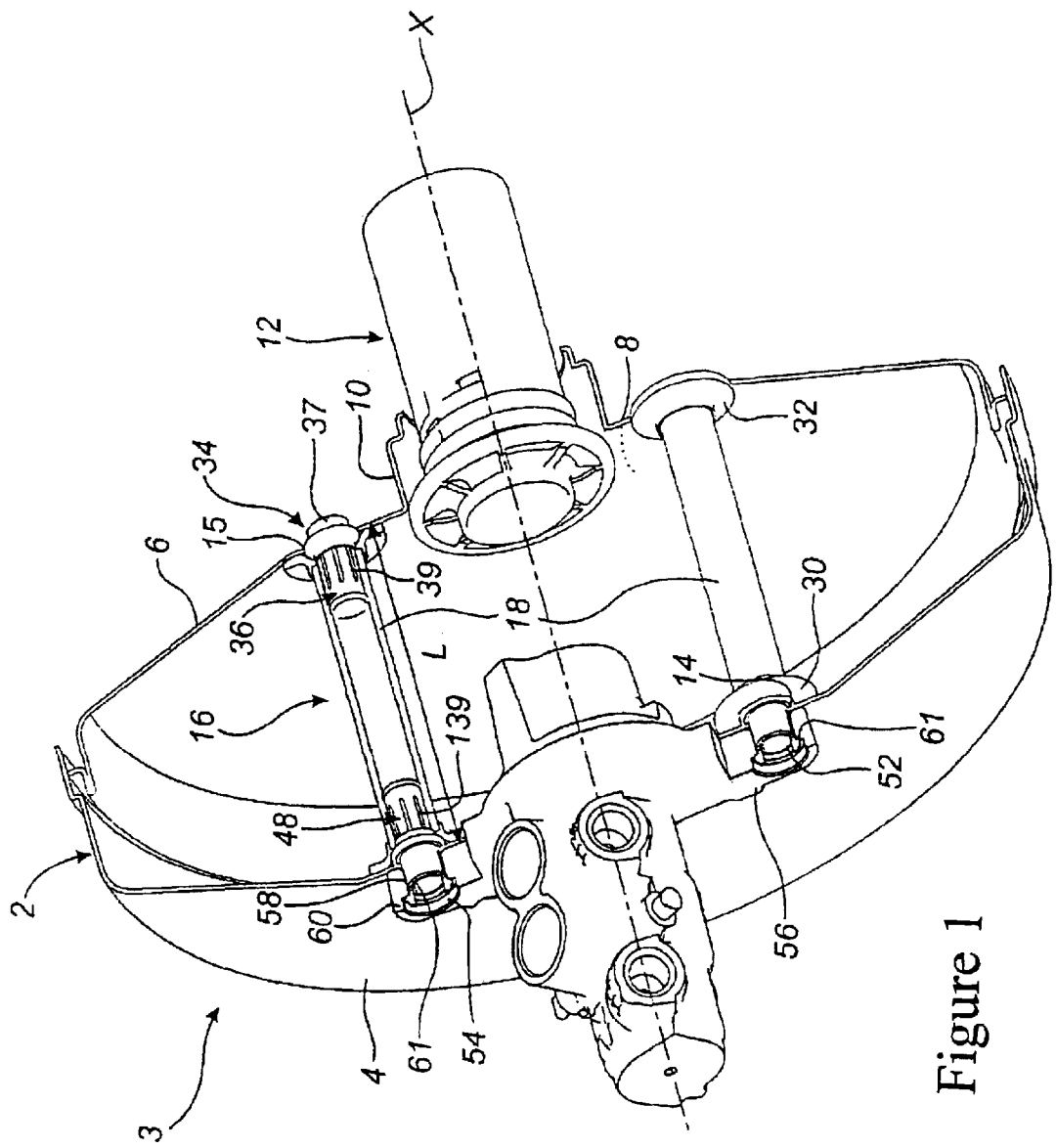
FIG. 1 is a view in part section of a booster and master cylinder system according to the present invention, during a first assembly step.

FIG. 1 shows a booster 3 according to the present invention comprising an envelope 2 of longitudinal axis X formed of a first and second shell 4, 6 which are connected to one another via their radially external end, for example by crimping. The envelope 2 defines an interior volume divided by a skirt (not depicted) mounted to slide with sealing, into a low-pressure chamber and a variable-pressure chamber. The first shell 4 or front shell comprises an orifice for the passage of a push rod, not depicted, transmitting the brake boosting effort supplied by the booster to a master cylinder and at least one orifice 14, advantageously two orifices, in which means 16 for stiffening the envelope are mounted. The second shell 6 or rear shell bears via an exterior face 8 against a bulkhead (not depicted) when mounted in the engine compartment of a motor vehicle and comprises a hollow shaft 10 running axially rearward. A three-way valve 12 actuated by a control rod (not depicted) that can be moved for example by a brake pedal is arranged in the hollow shaft 10. The second shell also comprises two orifices 15 for the passage of the stiffening means 16. The way in which the three-way valve and also the booster work is known, and so it will not be described further in detail.

Figure 2:
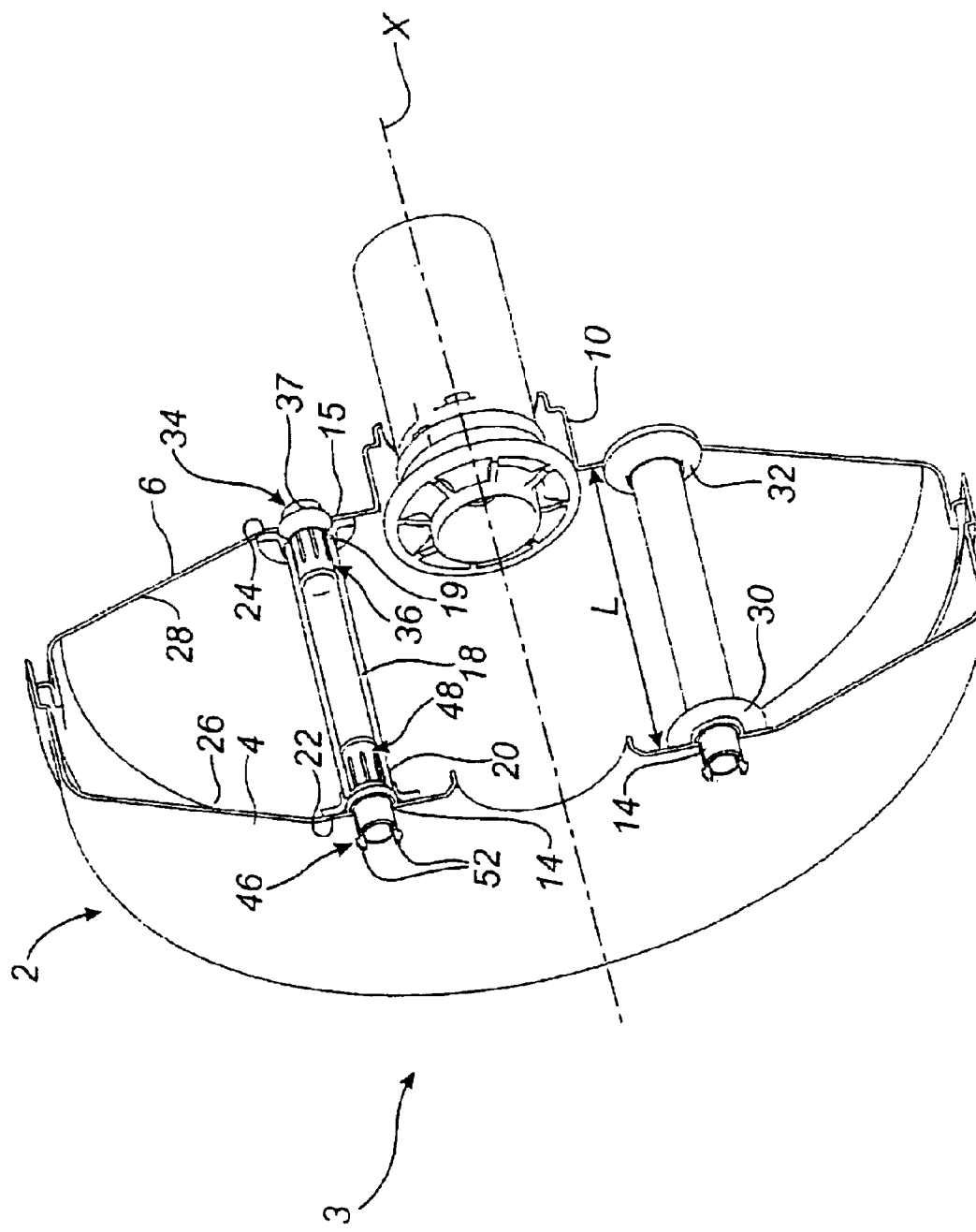
FIG. 2 is a view in part section of a booster according to the present invention.
Figure 3:
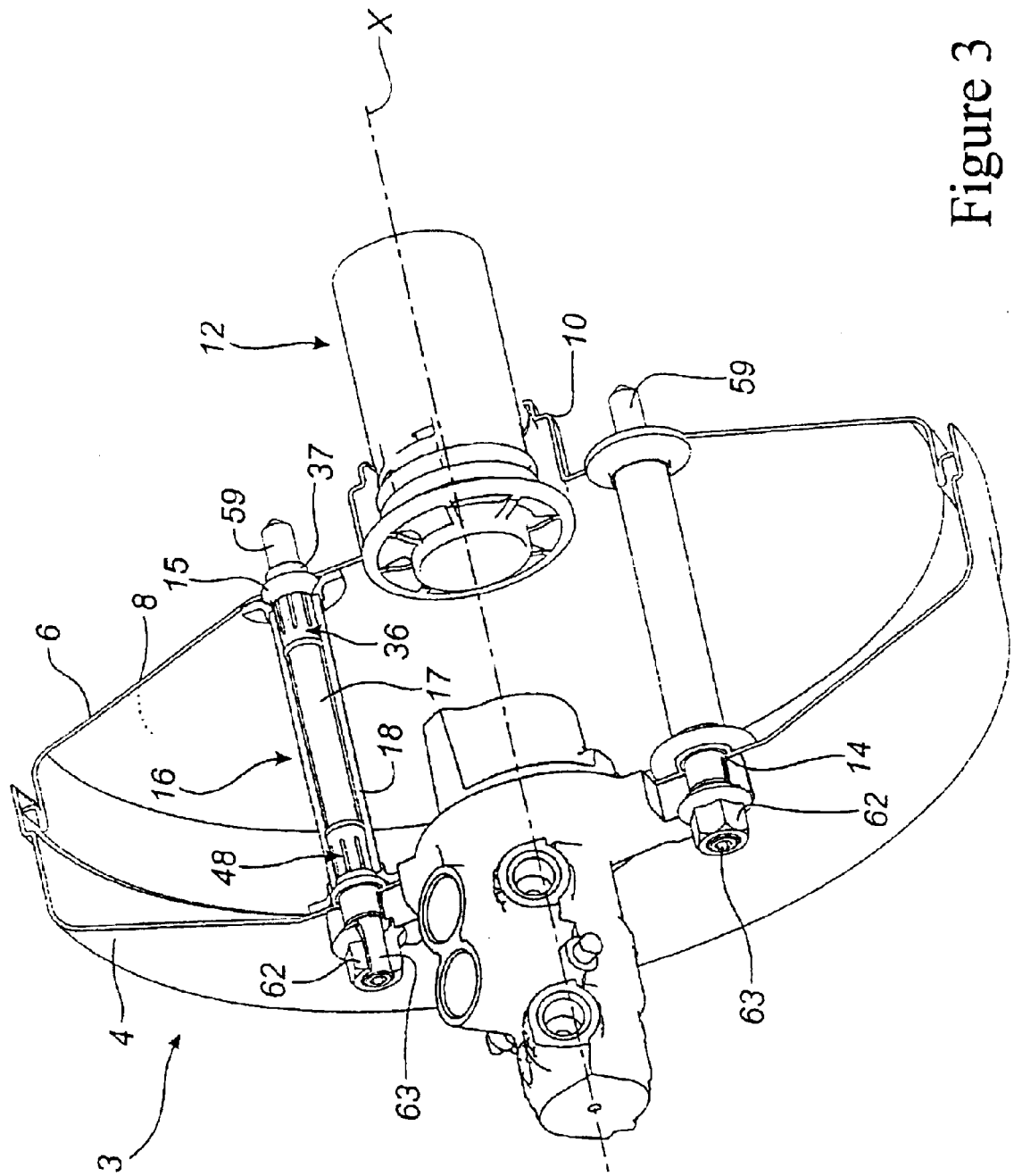
FIG. 3 is a view in part section of the system of FIG. 1 during a second assembly step.

The stiffening means 16 comprises a tierod 17 in the form of a rod (FIGS. 3 and 4) and a spacer element 18 in which the tierod 17 is mounted, the tierod 17 and the spacer element 18 both being of axis parallel to the longitudinal axis X. FIG. 2 shows the spacer element 18 of axis parallel to the axis X, of tubular shape, comprising, at a first longitudinal end 20 and at a second longitudinal end 19, the opposite end to the first end, first and second bearing surfaces 22, 24 respectively, collaborating with the interior faces 26, 28 of the first and second shells 4, 6. The bearing surfaces are advantageously borne by loose flanges 30, 32, for example force-fitted onto the exterior periphery of the tube 18 so as to fix a given separation L between the first and second shells 4, 6. It may also be anticipated for the loose flanges to be attached by welding or bonding. However, it is not necessary to fix them to the tube 18, and it is sufficient simply to anticipate holding the loose flanges in position during assembly. Of course, provision may be made for a tube to be produced that is equipped with one flange formed as an integral part of the tube, and a second loose flange mounted after the skirt of the booster has been mounted.

Figure 5:
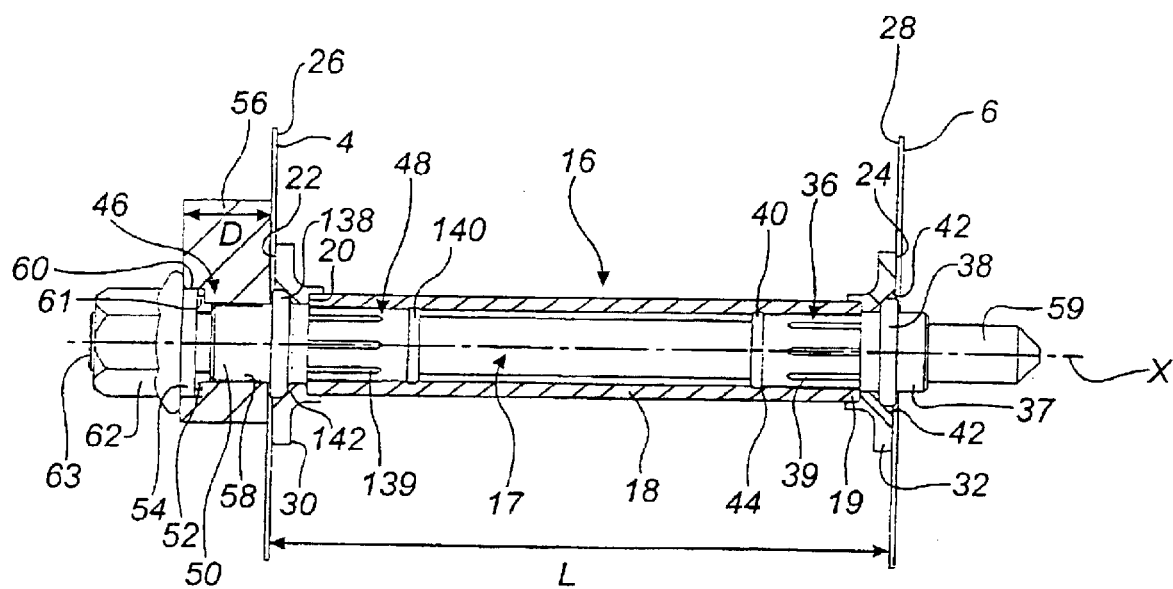

FIG. 5 also shows the stiffening means 16 comprising, at the second end 19 of the tube 18, a means 34 for angularly indexing the booster with respect to the bulkhead, this means being formed of a sleeve tube 36 mounted in the tube 18 in a fixed manner, for example by force-fitting, and equipped with an axial end 37 projecting into an orifice in the bulkhead (not depicted) designed for the passage of the tierod. The outside diameter of the axial end 37 is roughly equal to the inside diameter of the orifice made in the bulkhead so as to fix the position of the booster with respect to the bulkhead. The sleeve tube 36 advantageously comprises, on its exterior surface, projecting longitudinal flutes 39 forcibly collaborating with the interior surface of the tube 18. The sleeve tube 36 is made for example of plastic, for example of thermoplastic. The interior space of the booster is isolated from the exterior environment by first and second sealing means 38, 40. The first sealing means 38 is mounted around the sleeve tube 36 bearing against the interior face 28 of the rear shell 6 and allows the orifice 15 to be plugged in a sealed way. The loose flange 32 advantageously has a chamfer 42 forming, with the interior face 28 of the shell 6, a housing for the seal 38. The seal 38 is advantageously made of elastomeric thermoplastic by molding on the thermoplastic sleeve tube 36, making it possible to have just one part to handle rather than two. However, it is conceivable for use to be made, for example, of an O-ring, for the sealing means 38.

The second sealing means 40 allows the passage between the exterior periphery of the tierod 17 and the interior periphery of the sleeve tube 36 to be plugged in a sealed way. The second sealing means 40 is arranged in the example depicted at one longitudinal end 44 of the sleeve tube 36, which end is arranged in the spacer element 18. Provision can also be made for the second means 40 to be inside the sleeve tube. The seal 40 is advantageously made of elastomeric thermoplastic by molding on the thermoplastic sleeve tube 36, making it possible to have just one part to handle rather than two. In consequence, in the example depicted, there is a one-piece subassembly formed of the sleeve tube 36 and the two seals 38, 40 secured to the sleeve tube 36, making the booster easier to mount. Provision may also be made for the sealing means 40 to be, for example, in the form of a conventional O-ring. The stiffening means 16 also comprises, at the first end 20 of the tube 18, a means 46 for attaching a master cylinder to the booster by clip-fastening.

Figure 4:
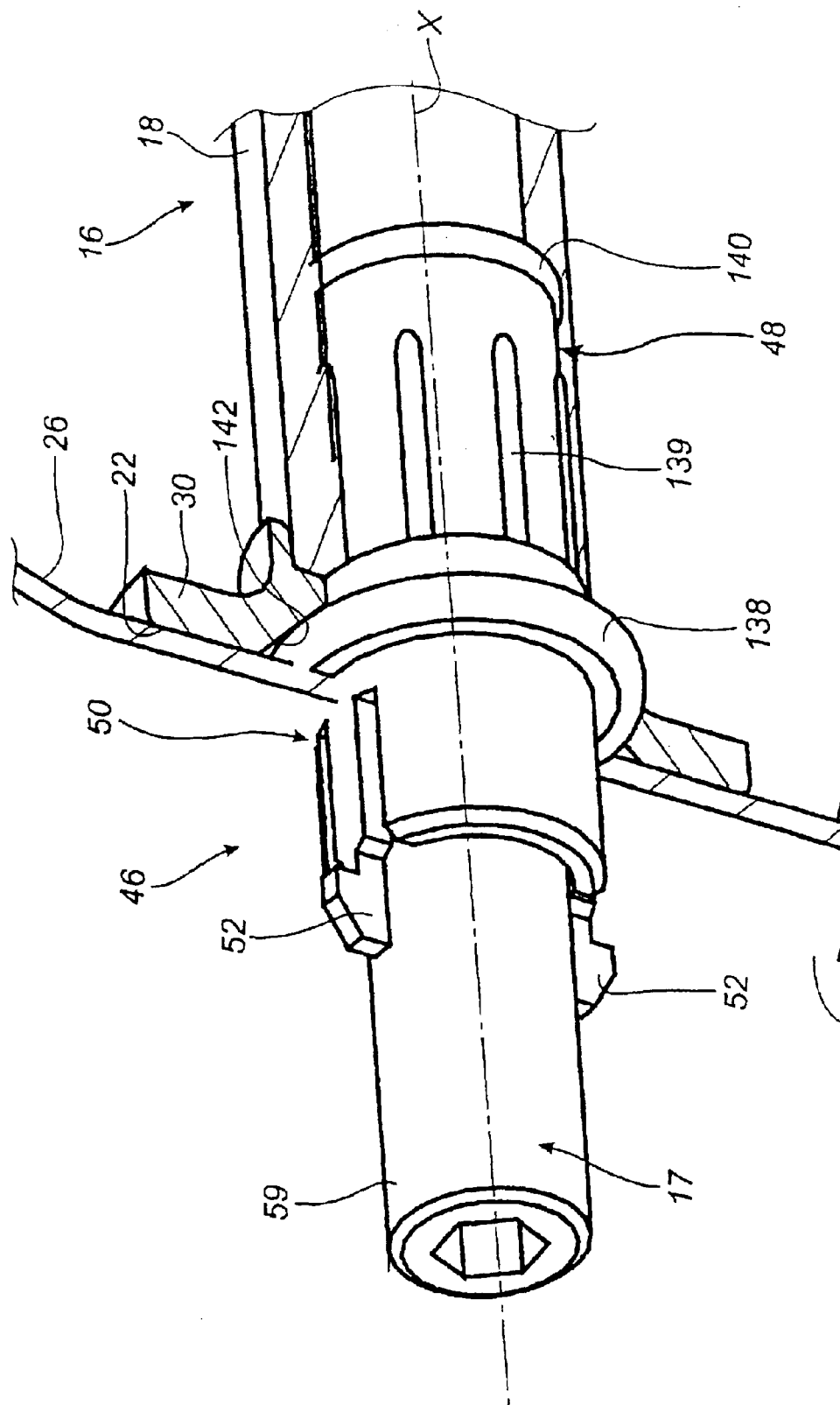
FIG. 4 is a detailed view of FIG. 3, in the absence of a nut and of the master cylinder.

The attachment means 46 comprises a second sleeve tube 48 secured to the tube 18 and equipped at one open longitudinal end 50 of the tube 18 with elastic elements 52 running radially toward the outside of the sleeve tube and forming a limit stop for a master cylinder flange (FIG. 4). The longitudinal extension D of the end 50 of the second sleeve tube 48 is enough to allow the elements 52 to emerge from the flange. In the example depicted, the elements 52 are formed of tabs distributed angularly, advantageously uniformly. The tabs 52 are, in the example depicted, two in number, diametrically opposed. The tabs 52 are retractable radially inward in an elastic manner so that they can move aside to enter a passage 54 made in the flange 56 of the master cylinder and return to their initial position when the tabs come back out of the passage 54. The flange advantageously comprises two passages 54 associated with each means 46 of attaching the master cylinder to the booster. In the example depicted, the passage 54 made in the flange 56 comprises a smaller-diameter first part 58 and a larger-diameter second part 60 directed toward the body of the master cylinder, the second part 60 being connected to the first part 58 by an annular bearing surface 61 forming a bearing surface for the tabs 52 once the flange 56 has been clip-fastened onto the booster. In the example depicted, the second sleeve tube 48 comprises third 138 and fourth 140 sealing means similar to the first and second means 38, 40. The loose flange 30 also has a chamfer 142 forming a housing for the third sealing means 138. The second sleeve tube 48 also advantageously has projecting longitudinal flutes 139 forcibly collaborating with the interior surface of the tube 18. However, O-rings or one O-ring and one elastomeric thermoplastic seal formed integrally with the sleeve tube could be envisaged.

Figure 6:
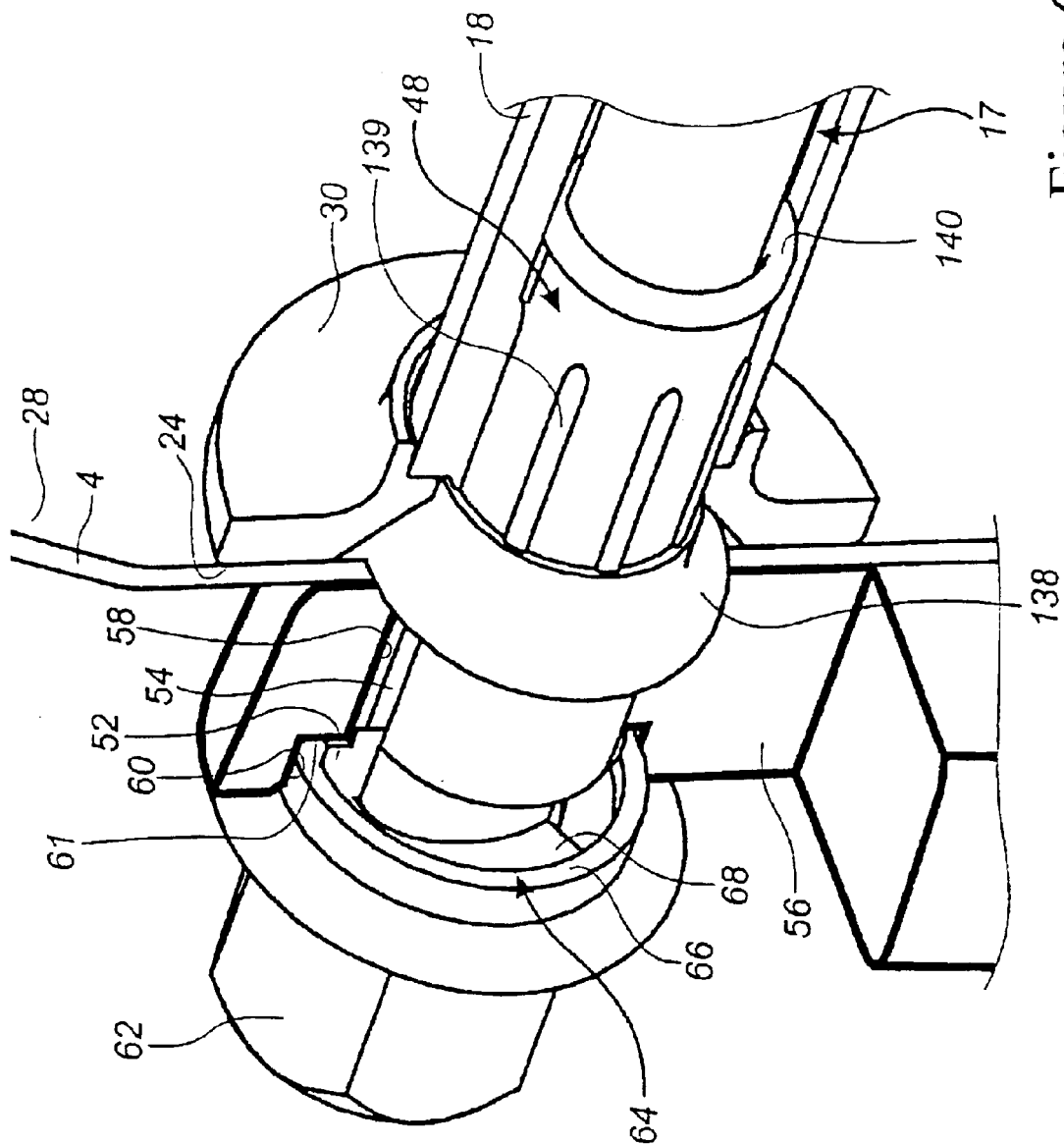
FIG. 6 is an enlarged view of FIG. 5.

The tierod 17, more or less rod-shaped, has a first longitudinal end 59 entering the passenger compartment of the motor vehicle via an orifice (not depicted) made in the bulkhead. The first end 59 has a screw thread collaborating with a first nut during mounting so as to secure the booster-master cylinder system to the bulkhead. The tierod 17 has a second longitudinal end 63 at the opposite end to the first end 59 and also equipped with a screw thread collaborating with a second nut 62 making it possible on the one hand to stiffen the envelope of the booster by determining the axial extension thereof and, on the other hand, to reinforce the attachment of the master cylinder to the booster. The second end 63 of the tierod 17 comprises, in the example depicted, a hexagon socket head to allow the first end 59 of the tierod 17 to be screwed into the passenger compartment. In the example depicted and as a preference, the second nut 62 comprises means 64 (FIG. 6) for breaking the tabs 52 as said nut 62 is tightened, thus making it possible, should there be a need to detach the master cylinder from the booster, to have only to remove the second nut 62 and without having to employ special tools to break the tabs in order to free the flange of the master cylinder.

The means 64 are formed of at least one ramp 68, advantageously a ramp associated with each tab 52. The ramps 68 are made in a longitudinal face 66 of the nut facing toward the flange. The ramps 68 are directed in such a way that as the nut is screwed onto the tierod, the tabs 52 are broken because of the rotational movement about the axis of the tierod on account of the tightening. In other words, the depth of said ramp 68 decreases in the direction of tightening of the second nut 62, forcing the associated tab 52 to break. The breaking means 64 advantageously make it possible not to have to orientate the second nut when it is tightened onto the tierod 17. It could be anticipated for the breakage means 64 to be produced as notches of a shape complementing that of the tabs 52, although that would require the second nut 62 to be orientated when mounting on the tierod 17. It could, however, be anticipated for the tabs 52 to be broken only at the time of detachment of the master cylinder, using an appropriate tool. In the example depicted, the nut 62 is attached to the tierod during the mounting of the booster-master cylinder system in the vehicle. However, it would be conceivable to provide a nut secured to the tierod 17.

We shall now describe the various steps of mounting the master cylinder-booster system:

The motor vehicle equipment manufacturer manufactures, on the one hand, the booster equipped with the spacer element 18, with the first and second sleeve tubes 36, 48 and with the first, second, third and fourth sealing means 30, 40, 138, 140 and, on the other hand, the master cylinder;

He then assembles the booster and the master cylinder by clip-fastening the flange of the master cylinder onto the clip-fastening attachment means 46 by bringing the master cylinder and the booster longitudinally closer together. He can then supply the motor vehicle manufacturer with a master cylinder-booster system that is easy to handle without the risk of losing part of the system, and ready to mount on the bulkhead;

The motor vehicle manufacturer needs to secure the booster-master cylinder system to the bulkhead of the vehicle;

The manufacturer places the booster-master cylinder system with respect to the bulkhead using the angular indexing means 34, inserts the tierod 17 into the sleeve tubes 36, 48 and the tube 18; and The tierod is then secured to the bulkhead using the first nut screwed onto the first end 59 and the second nut 62 is screwed onto the second end 63 of the tierod so as to stiffen the envelope of the booster, reinforcing the attachment of the master cylinder to the booster, as the nut 62 is tightened, the tabs 52 are broken off.

To detach the master cylinder all that is required is for the second nut 62 to be loosened, it then being possible for the master cylinder to be removed without the need to detach the booster from the bulkhead of the vehicle.

The exemplary embodiment described hereinabove is that of a booster equipped with means for stiffening the envelope and bearing means for attaching the master cylinder to the booster by clip-fastening, but of course it is obvious that a booster equipped with clip-fastening attachment means borne directly by the envelope of the booster would not constitute a departure from the scope of the present invention.

A booster allowing quick and reliable attachment of the master cylinder so that the booster-master cylinder system can be handled and mounted on the bulkhead has indeed been produced.

A compact and low-cost attachment of the master cylinder to the booster has also been achieved, allowing the master cylinder to be released without detaching the booster from the bulkhead of the vehicle, it being possible for the master cylinder to be released without the use of special tools.

The present invention applies in particular to the motor industry.

The present invention applies mainly to the braking industry for motor vehicles, in particular for private cars.

We claim:

1. A pneumatic brake booster comprising an envelope (2) of longitudinal axis (X) formed of a first (4) and of a second (6) shell, and defining an interior volume divided by a moving skirt into a low-pressure first chamber and a variable-pressure second chamber, a three-way valve (12) actuated by a control rod and placing the front chamber and the rear chamber in communication at rest and during a braking phase interrupting the communication between the front chamber and the rear chamber and supplying the rear chamber with pneumatic fluid at high pressure, said booster being characterized by means (46) including a first sleeve tube (36) and a second sleeve tube (48), said second sleeve tube (48) having tabs (52) that radially extend outward there from to allow a master cylinder to be attached to said booster by being plastically deformable in the radial direction on enter into a passage (54) in a flange (56) of the master cylinder and returning to the initial position when the attachment operation is complete.

2. The booster according to claim 1, characterized in that said tabs are regularly angularly distributed, advantageously being two in number, diametrically opposed.

3. The booster according to claims 2, further characterized in that said second sleeve tube (48) is secured to the first shell (4) of the envelope (2) of the booster.

4. The booster according to claim 3, further characterized in that the second sleeve tube is mounted securely on a spacer element (18) arranged between the first (4) and second (6) shells of the booster and of longitudinal axis parallel to the axis (X) of the booster.

5. The booster according to claim 4, further characterized in that the spacer element (18) in which the second sleeve tube (48) is mounted via an orifice (14) made in the first shell (4) is of tubular shape.

6. The booster according to claim 5, further characterized in that the spacer element (18) comprises annular elements (30, 32) at a first (20) and at a second (19) longitudinal end bearing against the interior faces (26, 28) of the first and second shells (4, 6).

7. The booster according to claim 6, further characterized in that said annular elements (30, 32) are loose flanges attached to the first and second ends (20,19) of the spacer element (18).

8. The booster according to claim 7, further characterized in that the booster comprises a means (34) for angularly indexing the booster with respect to a bulkhead of a motor vehicle secured to the second shell (6) of the booster.

9. The booster according to claim 8, further characterized in that the angular indexing means (34) are formed of a longitudinal end of a first sleeve tube (36) projecting from the second shell (6) toward the outside of the envelope (2) of the booster.

10. The booster according to claim 9, further characterized in that the first sleeve tube (36)is secured to the spacer element (18).

11. The booster according to claim 10, further characterized in that the first and second sleeve tuba (36, 48) are force-fitted into the spacer element (18).

12. The booster according to claim 11, further characterized in that the first (36) and second (48) sleeve tubes have longitudinal flutes (39,139) projecting from their exterior periphery and forcibly collaborating with the interior surface of the tubular spacer element (18).

13. The booster according to claim 12, further characterized in that the first (36) and second (38) sleeve tubes are made of thermoplastic.

14. The booster according to claim 13, further characterized in that the first end second sleeve tubes (36, 48) comprise means (38, 40, 138, 140) leaktightly isolating the inside of the booster from the external environment.

15. The booster according to claim 14, further characterized in that the sealing means (38, 40, 138, 140) are made of elastomeric thermoplastic.

16. The booster according to claim 1 for use in a brake system wherein a master cylinder has a flange (56) pierced with diametrically opposed passages (54) and passages (54) collaborate with the means (46) for allowing the master cylinder to be clip-fastened onto the booster.

17. The booster according to claim 16, characterized in that said booster is secured to a bulkhead of a motor vehicle using tierods (17) mounted in the first and second sleeve tubes (36, 48) and the spacer element (18) so as to emerge on each side of the booster along the longitudinal axis (X).

18. The booster according to claim 17, further characterized in that the tierod (17) comprises, at first and second longitudinal ends, a first and a second screw thread collaborating with a first and a second (62) nut, said first nut allowing the booster to be fixed to the bulkhead and the second nut stiffening the envelope (2) of the booster and reinforcing the attachment of the master cylinder to the booster.

19. The booster according to claim 18, characterized in that the second nut (62) comprises means (64) for breaking off the tabs (52) of the clip-fastening attachment means as the second nut (62) is screwed onto the tierod (17).

20. The booster according to claim 19, characterized in that the means (64) for breaking comprise at least one ramp (68) made on one face of the nut in contact with the flange of the master cylinder and orientated in such a way that the depth of said ramp (68) decreases as the second nut (62) is tightened.

* * * * *